(12) United States Patent
Scharf et al.

(10) Patent No.: US 8,849,220 B2
(45) Date of Patent: Sep. 30, 2014

(54) ELECTRONIC DEVICE INCLUDING ELONGATE CONNECTORS BETWEEN STACKED CIRCUIT BOARDS AND RELATED METHODS

(75) Inventors: Robert Marc Scharf, West Palm Beach, FL (US); Randal Bruce Lord, Rogersville, TN (US)

(73) Assignee: Moog Inc., East Aurora, NY (US)

( * ) Notice: Subject to any disclaimer, the term of this patent is extended or adjusted under 35 U.S.C. 154(b) by 646 days.

(21) Appl. No.: 13/072,125

(22) Filed: Mar. 25, 2011

(65) Prior Publication Data

US 2012/0244823 A1    Sep. 27, 2012

(51) Int. Cl.
- H04B 1/38   (2006.01)
- G06F 1/18   (2006.01)

(52) U.S. Cl.
CPC ..................... G06F 1/185 (2013.01)
USPC ....................................... 455/90.3

(58) Field of Classification Search
CPC ....................................... G06F 1/185
USPC ....................................... 455/90.3
See application file for complete search history.

(56) References Cited

U.S. PATENT DOCUMENTS

| | | | | |
|---|---|---|---|---|
| 4,733,461 | A | * | 3/1988 | Nakano ............................ 29/830 |
| 5,920,459 | A | * | 7/1999 | Weber et al. ................... 361/752 |
| 2001/0031568 | A1 | | 10/2001 | Brekosky et al. |
| 2007/0297158 | A1 | | 12/2007 | Lee |

FOREIGN PATENT DOCUMENTS

EP    0213205 A1    3/1987

OTHER PUBLICATIONS

WIPO, International Search Report mailed Jun. 18, 2012 in International Application No. PCT/US2012/027860.
WIPO, Written Opinion of the International Searching Authority mailed Jun. 18, 2012 in International Application No. PCT/US2012/027860.
WIPO, International Preliminary Report on Patentability mailed Oct. 10, 2013 in International Application No. PCT/US2012/027860.

* cited by examiner

Primary Examiner — David Bilodeau
(74) Attorney, Agent, or Firm — Hodgson Russ LLP (57) ABSTRACT

An electronic device may include a plurality of circuit boards, data processing circuitry carried by the plurality of circuit boards, and a plurality of connectors electrically and mechanically coupling the circuit boards in a stacked spaced relation defining a plurality of levels. The elongate connectors may include pairs of parallel first and second elongate connectors between adjacent circuit boards, and with each pair of parallel first and second elongate connectors being rotationally offset in successive levels.

20 Claims, 6 Drawing Sheets

ELECTRONIC DEVICE INCLUDING ELONGATE CONNECTORS BETWEEN STACKED CIRCUIT BOARDS AND RELATED METHODS

FIELD OF THE INVENTION

The present invention relates to the field of electronics, and, more particularly, to electronics packaging and related methods.

BACKGROUND OF THE INVENTION

Mobile wireless communications systems continue to grow in popularity and have become an integral part of both personal and business communications. For example, a portable radio device, allows users to communicate data and voice from almost anywhere. When coupled to a laptop computer, for example, a portable radio device may provide wireless access to a network, for example, the Internet. As the use of portable radio devices continues to increase, so too does the demand for smaller and more rugged devices which are easier and more convenient for users to carry, and which are increasingly resilient in harsh environmental conditions.

To reduce overall weight in a multi-user mobile environment, for example, rather than each user carry his own radio device, it may be desirable to have multiple users share a single radio device. Current approaches include a two-box approach where a switch is coupled between the radio device and each user's computer. For example, the ET-8xG-MIL-1 gigabit managed Ethernet switch, available from Sixnet, LLC of Ballston Lake, N.Y., includes a water-tight housing that may be directly mounted in a vehicle, for example. A radio device having its own housing is coupled to the ET-8xG-MIL-1 gigabit managed Ethernet switch to couple one port, for example, of the radio device, to many ports for multiple users.

Additionally, the DuraMar™ and DuraNet™ series of Ethernet switches, available from Parvus Corporation of Salt Lake City, Utah, similarly provide a two-box approach to mobile networking applications. More particularly, the DuraMar™ and DuraNet™ Ethernet switches include a separate housing from the radio device. In other words, the Ethernet switch is external to the radio device.

However, in many mobile applications, a two-box approach may be less desirable, as a user must carry two separate devices, thus using more space and increasing weight. Additionally, wires or cables are used to couple the two devices. This may be especially burdensome to a user carrying such devices.

SUMMARY OF THE INVENTION

In view of the foregoing background, it is therefore an object of the present invention to provide an integrated system with reduced package size, package weight, and power requirements.

This and other objects, features, and advantages in accordance with the present invention are provided by an electronic device that may include a plurality of circuit boards, data processing circuitry carried by at least one of the plurality of circuit boards, and a plurality of elongate connectors electrically and mechanically coupling the circuit boards in a stacked spaced relation defining a plurality of levels. The elongate connectors may include pairs of parallel first and second elongate connectors between adjacent circuit boards, and with each pair of parallel first and second elongate connectors being rotationally offset in successive levels. Accordingly, the electronic device has a reduced package size yet is also rugged and reliable. It may be coupled within a radio device, for example, because of the reduced increased weight and overall housing size.

Each of the circuit boards may have a rectangular shape. The first and second elongate connectors may be adjacent opposing edges of a corresponding circuit board, for example, and the rotation offset may be ninety degrees.

Each circuit board may include a plurality of through-holes therein. Each elongate connector may include first and second mating portions, for example. Each mating portion may include an elongate dielectric body and a plurality of contact pins extending outwardly through corresponding ones of the through-holes and secured therein.

The data processing circuitry may include data routing circuitry, for example. The electronic device may further include a wireless transceiver coupled to the data processing circuitry.

The electronic device may further include an input connector coupled to a first one of the plurality of circuit boards, and an output connector coupled to a last one of the circuit boards. The output connector may define a plurality of input/output (I/O) ports, and the input connector may define a single I/O port, for example. The electronic device may further include a shell surrounding the plurality of circuit boards.

A method aspect is directed to making an electronic module. The electronic module may include plurality of circuit boards and data processing circuitry carried by the plurality of circuit boards, and a plurality of elongate connectors comprising pairs of parallel first and second elongate connectors between adjacent circuit boards.

The method may include electrically and mechanically coupling, via the plurality of elongate connectors, the circuit boards in a stacked spaced relation to define a plurality of levels, for example. The circuit boards may be electrically and mechanically coupled so that each pair of parallel first and second elongate connectors is rotationally offset in successive levels, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a radio device 10 includes a device housing 11 and an electronic module 20 carried by the device housing. The radio device 10 may be a mobile wireless communications device, for example, a cellular radio device. The radio device 10 includes wireless transceiver circuitry 12 for performing the wireless communications functions. The wireless transceiver circuitry is coupled to an antenna 53. Additional hardware, for example, a controller 13, may be coupled to the wireless transceiver circuitry and carried by the device housing 11.

Figure 2:
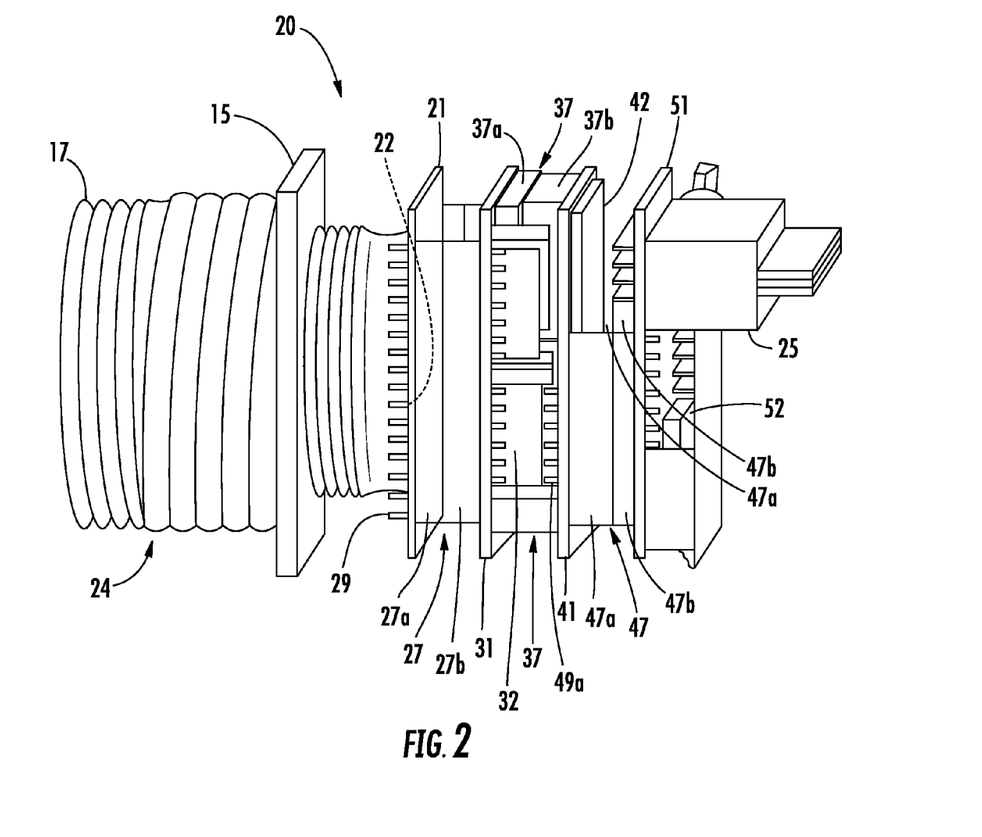
FIG. 2 is side perspective view of the electronic module of the electronic device of FIG. 1 with the shell removed.
Figure 3:
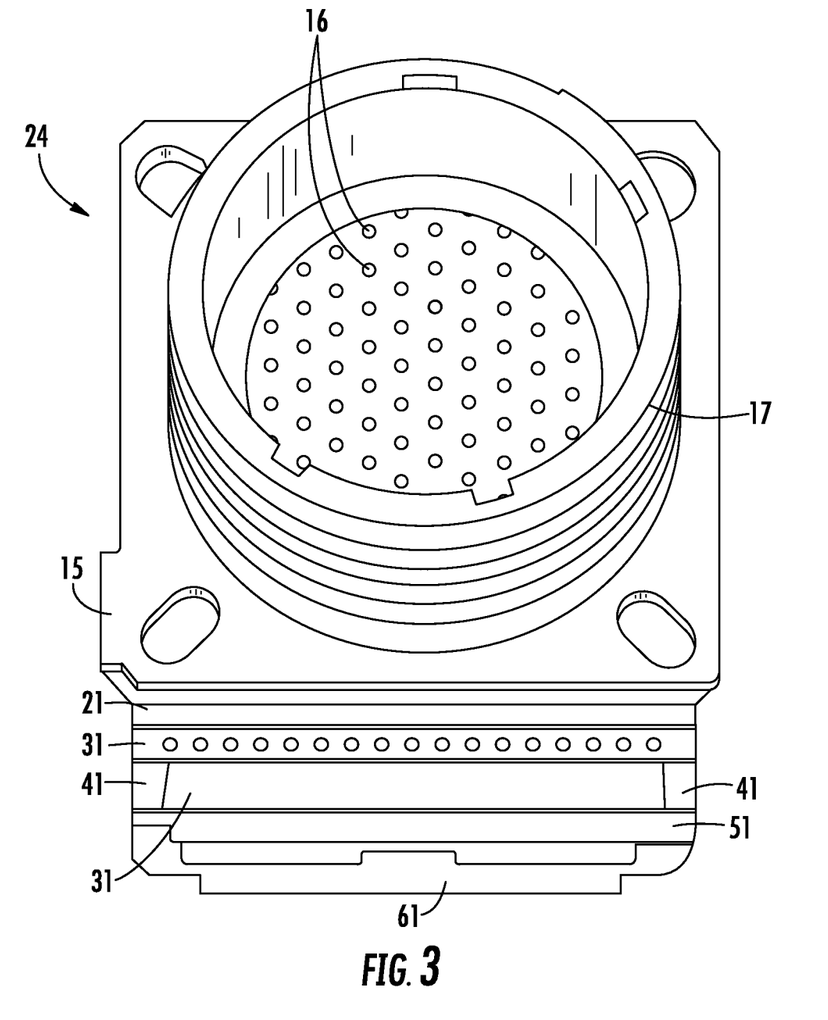
FIG. 3 is a front perspective view of the electronic module of FIG. 1 with the shell removed.
Figure 4:
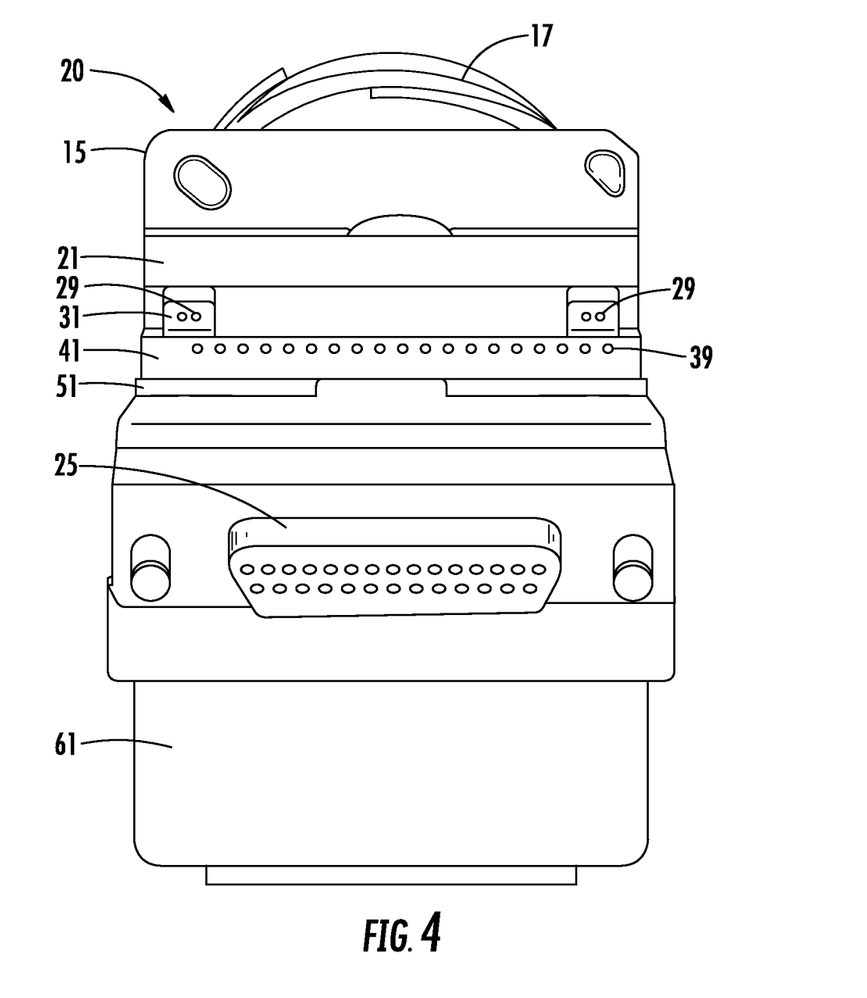
FIG. 4 is a rear perspective view of the electronic module of FIG. 1 with the shell removed.

The electronic module 20 includes circuit boards 21, 31, 41, 51. Each circuit board 21, 31, 41, 51 may be a printed circuit board (PCB) (i.e. a rigid circuit board) with one or more electronic components mounted thereon. Each of the circuit boards 21, 31, 41, 51 illustratively has a rectangular shape (FIG. 2). The circuit boards 21, 31, 41, 51 may be other shapes.

An output connector 24 is coupled the first circuit board 21. The output connector 24 is illustratively a D38999 connector, and includes 66 pins 16 defining four I/O ports. The four I/O ports may be four active 10/100/1000 Base-T ports, for example. The four I/O ports may be auto-negotiable. The four I/O ports may each be an automatic media-dependent interface (MDI) or an automatic media-dependent interface crossover (MDIX).

The output connector 24 is illustratively cylindrically shaped and includes threads 17 on an outer portion to couple to a mating cable 14, for example. Indeed, while the output connector 24 is considered an "output," it will be appreciated by those skilled in the art that data may be input or output via the output connector. The mating cable 14 couples the output connector 24 to computers, such as, for example, laptop computers 19a-19d. The mating cable 14 may be a breakout cable, for example, including four RJ-45 or micro-D connectors for coupling to respective laptop computers 19a-19d. Other types of computers 19a-19d or communications devices may also be used. The output connector 24 also includes a flange 15 for mounting to an inside of the device housing 11.

The electronic module 20 also includes data processing circuitry 22, 32, 42, 52 carried by one or more of the circuit boards 21, 31, 41, 51. The data processing circuitry 22, 32, 42, 52 may be particularly useful in providing data routing or switching, for example, Ethernet data routing or switching. For example, the data processing circuitry 22, 32, 42, 52 may provide 4+1 port unmanaged Ethernet switching for 5×10/100/1000 Base-T switched interface I/O ports. In particular, the first circuit board 21 may be a front I/O adapter PCB and include circuitry 22 for adapting the four I/O ports from the output connector 24 to the next circuit board 31 in the stack. Other circuitry may be included on the first PCB 21. The first PCB 21 also illustratively includes a ground plane layer 54 or shielding layer. The first PCB 21 may include more than one ground plane layer, as will be appreciated by those skilled in the art.

A second circuit board 31 may be a front galvanic isolation PCB. The second circuit board 31 may include circuitry 32 that provides multi-port protection and impedance matching for the four I/O ports from the output connector 24. Other circuitry may be included on the second circuit board 31.

A third circuit board 41 may be a switching PCB. The third circuit board 41 may include a multi-port communications processing circuitry 42 for routing signals among the I/O ports, both the four I/O ports from the output connector 24, and a single I/O port from the input connector 25. Other circuitry may be included on the third PCB 41.

A fourth, or last circuit board 51 may be a back I/O adapter PCB. The fourth circuit board 51 may include power supply input and Galvanic isolation circuitry 52 for the input port or connector 25. Other circuitry may also be included on the fourth PCB 51. As will be appreciated by those skilled in the art, similar to the first PCB 21, the second, third, and fourth PCBs 31, 41, 51 may also include one or more a ground plane layers or shielding layers (not shown).

The input connector 25 is coupled to or carried by the fourth or last PCB 51. The input connector 25 is illustratively a micro-D connector and defines the single I/O port. Of course, the input connector 25 may be another type of connector, and there may be more than one connector to define more than one I/O port. Similar to the output connector 24, data may be either input or output via the input connector 25. The device controller 13 and/or wireless transceiver circuitry 12 are coupled to the input connector 25 via a coupling cable 18 as perhaps best shown in FIG. 1.

As will be appreciated by those skilled in the art, the circuitry 22, 32, 42, 52 is advantageously carried within the device housing 11. This allows the functionality of the circuitry, 22, 32, 42, 52, which would otherwise be external to the device housing 11, as in the prior art, to be included with the wireless transceiver circuitry 12 in the device housing. In other words, in contrast to the prior art where additional external cables typically couple a radio device to a separate, bulky, free-standing Ethernet switch, the electronic module 20 is advantageously mechanically and electrically coupled within the radio device 10. Of course in other embodiments, the module 20 may be used in a stand-alone fashion or within another device other than a radio device as will be appreciated by those skilled in the art.

Figure 5:
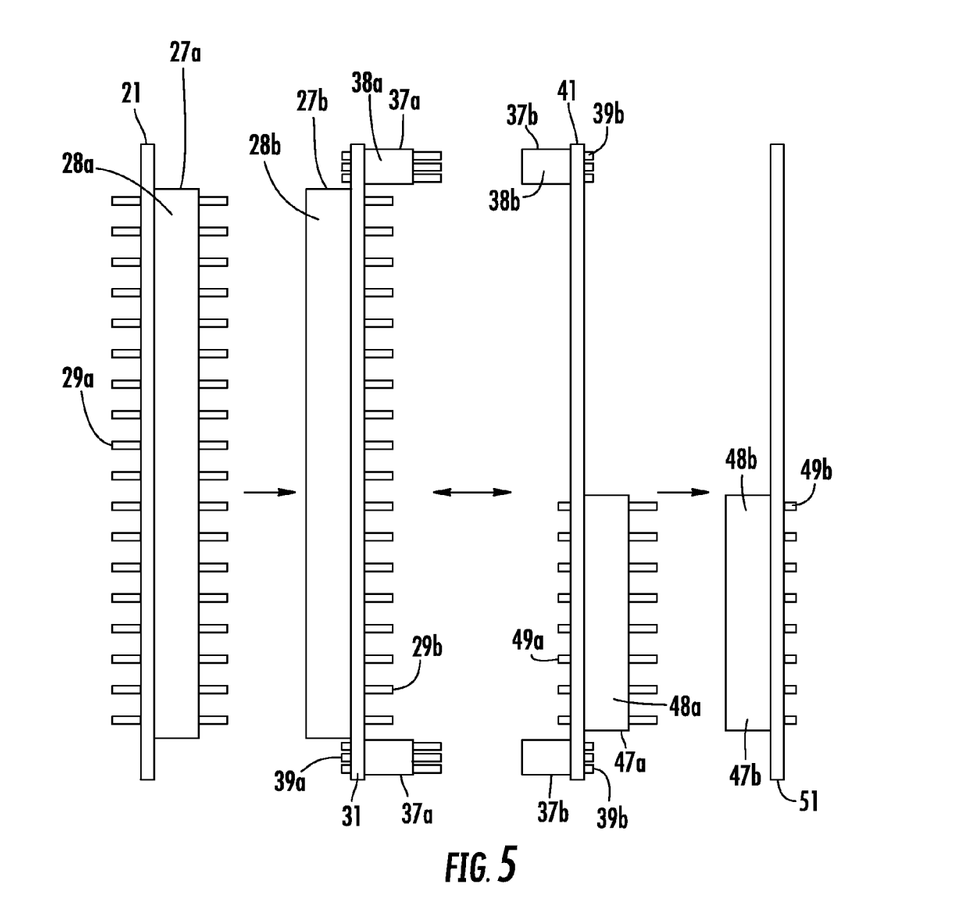
FIG. 5 is an enlarged exploded view of the circuit boards and connector pairs of the electronic module of FIG. 1.
Figure 6:
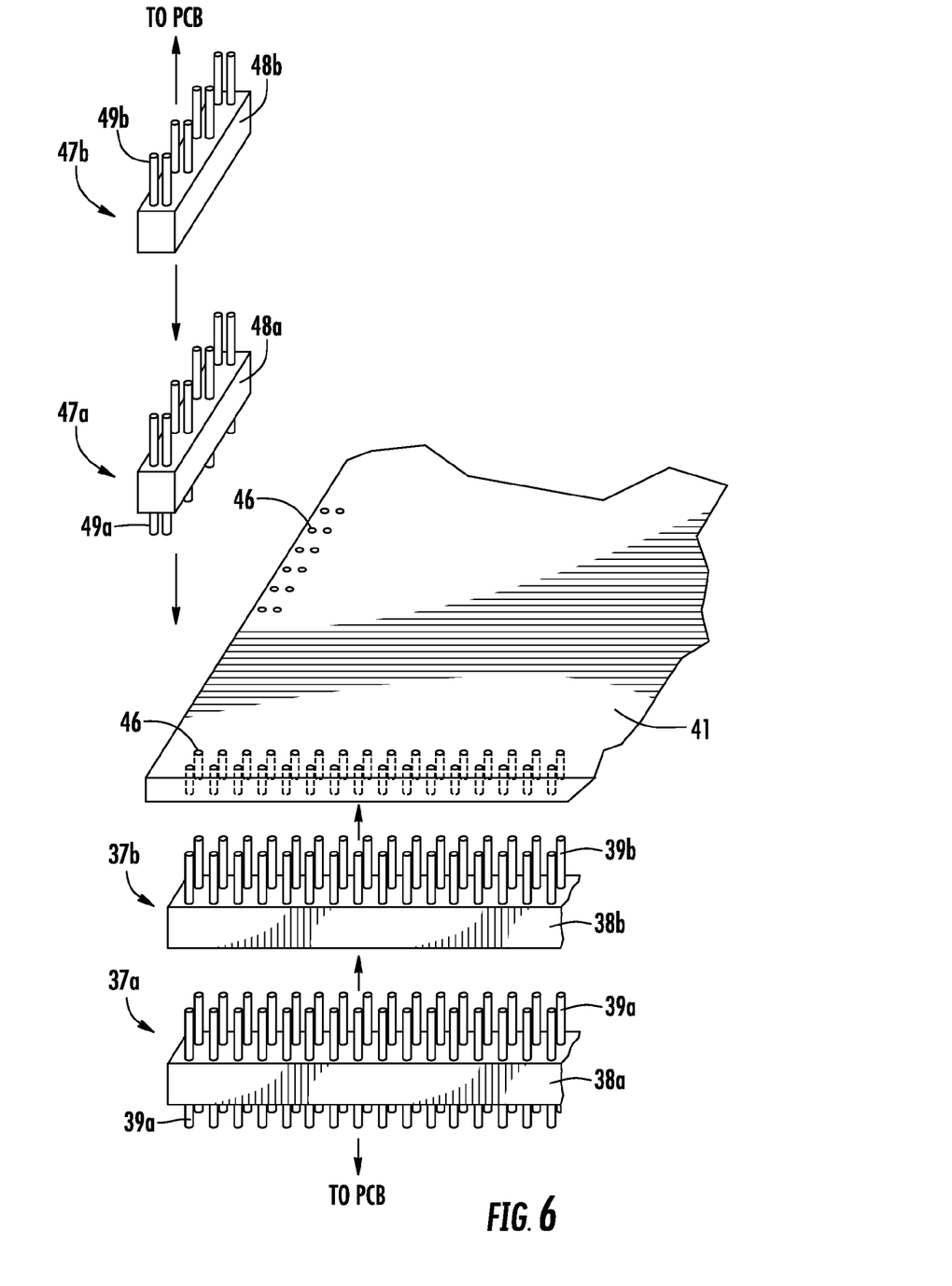
FIG. 6 is an enlarged exploded view of two connectors and a PCB of the electronic module of FIG. 1.

Referring now additionally to FIGS. 5-6, pairs of first and second parallel elongate first and second connectors 27, 37, 47 electrically and mechanically couple the circuit boards 21, 31, 41, 51 in a stacked spaced relation defining a plurality of levels. The pairs of parallel first and second elongate connectors 27, 37, 47, are between adjacent circuit boards 21, 31, 41, 51. The pairs of first and second elongate connectors 27, 37, 47 are adjacent opposing edges of a corresponding circuit board 21, 31, 41, 51 and illustratively extend more than half the length of the corresponding circuit board edge. The length of the pairs of elongate connectors 27, 37, 47 and their position advantageously increases the structural integrity of the electronic module 20 and allows spacing for the corresponding circuitry. Of course, the pairs of elongate connectors 27, 37, 47 may be positioned elsewhere on the corresponding circuit boards and they may extend to different lengths.

Each pair of parallel first and second elongate connectors 27, 37, 47 is rotationally offset in successive levels. In particular, the rotation offset is ninety degrees as is particularly advantageous for rectangular shaped circuit boards 21, 31, 41, 51. As will be appreciated by those skilled in the art, the rotationally offset arrangement and position of the elongate connectors 27, 37, 47 in successive levels of the circuit boards 21, 31, 41, 51 advantageously increases mechanical rigidity of the electronic module 20. Moreover, the pairs of elongate connectors 27, 37, 47 allow for an increased accessibility and more compact circuit board packaging arrangement.

Each circuit board 21, 31, 41, 51 illustratively includes through-holes 26, 36, 46, 56 therein (FIG. 6). Each elongate connector 27, 37, 47 also includes first and second mating portions 27a, 27b, 37a, 37b, 47a, 47b, and each mating portion illustratively includes an elongate dielectric body 28, 38, 48, and contact pins 29a, 29b, 39a, 39b, 49a, 49b extending outwardly through corresponding ones of the through-holes and secured therein. The contact pins 29, 39, 49 extending through the through-holes 26, 36, 46, 56 further increases mechanical strength. As will be appreciated by those skilled in the art, the contact pins 29, 39, 49 may be secured to the respective circuit board 21, 31, 41, 51 via solder joints, for example. The second mating portions 27b, 37b, 47b each include pin receiving openings (not shown) to receive corresponding contact pins 29a, 39a, 49a, from respective first mating portions 27a, 37a, 47a as will be appreciated by those skilled in the art. Other types of connectors and/or mating arrangements may be used, for example, an alignment gauge.

A back plate 61 may also be carried by the last circuit board 51. The back plate 61 cooperates with a housing or shell 62 (FIG. 1) that surrounds and protects the circuit boards 21, 31, 41, 51. A potting material, not shown, may fill the space and encapsulate the components within the shell, as will be appreciated by those skilled in the art.

The electronic module 20 advantageously can withstand increased harshness environmental conditions. For example, the electronic module 20 may operate in temperatures ranging from −40° Celsius to +85° Celsius. Additionally, the electronic module 20 may have reduced power requirements, for example, the electronic module may have a power supply voltage input of either 3.3 volts, 12 volts, or 28 volts, and may operate using less than 5 watts, for example. In contrast, prior art Ethernet switches, such as, for example, the DuraMar™ 1000 Ethernet switch uses 18 watts, and the DuraNet™ 1059 Ethernet switch uses less than 8 watts.

The electronic module 20 advantageously mounts within the radio device 10 with a reduced increase in weight, as the electronic module may weigh less than 8 ounces, for example. In contrast, prior art Ethernet switches, such as, for example, the DuraMar™ 1000 Ethernet switch weighs 7.5 pounds, the DuraNet™ 1059 Ethernet switch weighs 1.9 pounds, and the ET-8xG-MIL-1 Ethernet switch weighs 4.25 pounds.

Figure 1:
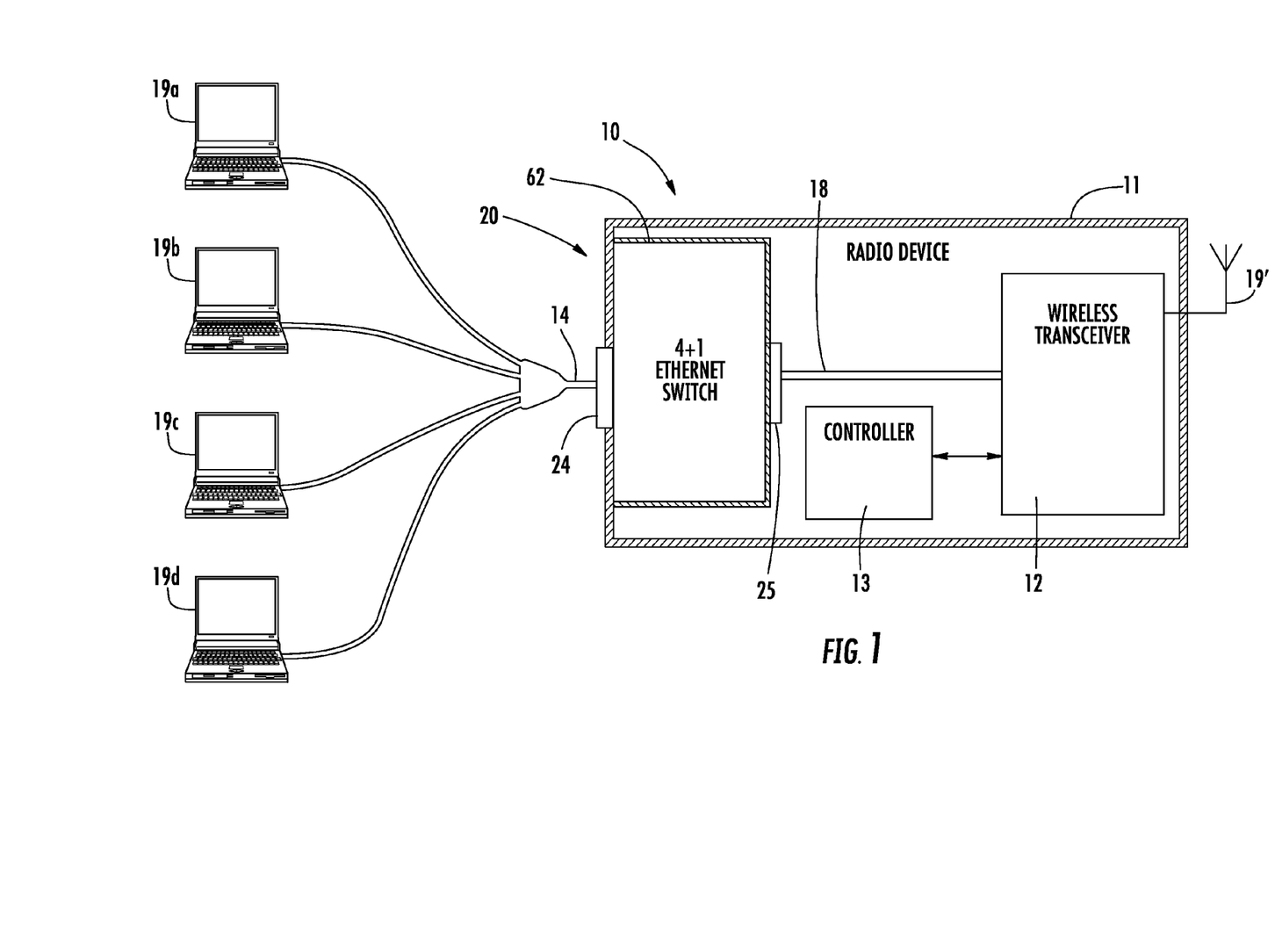
FIG. 1 is a block diagram of a communications system including an electronic device in accordance with the present invention.

Since the electronic module 20 can be made relatively small in size, for example, about 2.3 inches by 1.4 inches, the electronic module can mount within the device housing 11 of radio device 10 (FIG. 1). The functionality of two devices (i.e. the radio device 10, and the electronic module 20 or Ethernet switch) is advantageously included within the single device housing 11. In contrast, the prior art Ethernet switches, while including a second housing, are relatively large in size. For example, the DuraMar™ 1000 Ethernet switch measures 8×4×6 inches, the DuraNet™ 1059 Ethernet switch measures 6×6.95×3.70 inches, and the ET-8xG-MIL-1 Ethernet switch measures 11×6×2.85 inches.

The circuit board and connector configuration offers increased rigidity, reduced weight, and allows for coupling within the radio device housing. For example, the circuit board and connector configuration is particularly advantageous over one or more flexible circuit boards, as the bend radius of the flexible circuit boards is limited. Additionally, bending of the flexible circuit boards may place additional stresses on the flexible circuit boards, which may not be desired for relatively harsh environmental conditions.

While the electronic module 20 is particularly advantageous when mounted within the radio device 10, it will be appreciated by those skilled in the art that the electronic module may be used in applications, both wired and wireless, that may normally use a switch, or more particularly, an Ethernet switch. For example, the electronic module 20 may be particularly advantageous in control systems, image processing systems, surveillance systems, warning systems, radar systems, sonar systems, and power distribution systems, for example. Of course the electronic module 20 may be used in other types of systems.

A method aspect is directed to making the electronic module 20. The method includes electrically and mechanically coupling, via the elongate connectors 27, 37, 47, the circuit boards 21, 31, 41, 51 in a stacked spaced relation to define a plurality of levels. The circuit boards 21, 31, 41, 51 are electrically and mechanically coupled so that each pair of parallel first and second elongate connectors 27, 37, 47 is rotationally offset in successive levels.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
a plurality of circuit boards including a front I/O adapter circuit board, a front galvanic isolation circuit board adjacent the front I/O adapter circuit board, a switching circuit board adjacent the front galvanic isolation circuit board, and a back I/O adapter circuit board adjacent the switching circuit board;
data processing circuitry carried by each of said plurality of circuit boards, wherein the front I/O circuit board carries circuitry for adapting data signals inputted from multiple ports to the front I/O circuit board for output to the front galvanic isolation circuit board, the front galvanic isolation circuit board carries circuitry providing multi-port protection and impedance matching for the data signals received from the front I/O circuit board, the switching circuit board carries multi-port communications processing circuitry for routing data signals among multiple ports, and the back I/O adapter circuit board carries galvanic isolation circuitry for an output port; and
a plurality of elongate connectors electrically and mechanically coupling said plurality of circuit boards in a stacked spaced relation defining a plurality of levels;
said plurality of elongate connectors comprising pairs of parallel first and second elongate connectors between adjacent circuit boards, and with each pair of parallel first and second elongate connectors being rotationally offset in successive levels.

2. The electronic device according to claim 1, wherein each of said circuit boards has a rectangular shape; and wherein said first and second elongate connectors are adjacent opposing edges of a corresponding circuit board.

3. The electronic device according to claim 1, wherein the rotation offset is ninety degrees.

4. The electronic device according to claim 1, wherein each circuit board has a plurality of through-holes therein; wherein each elongate connector comprises first and second mating portions; and wherein each mating portion comprises an elongate dielectric body and a plurality of contact pins extending outwardly through corresponding ones of the through-holes and secured therein.

5. The electronic device according to claim 1, further comprising a wireless transceiver coupled to said data processing circuitry.

6. The electronic device according to claim 1, further comprising an input connector coupled to the back I/O adapter circuit board, and an output connector coupled to the front I/O adapter circuit board.

7. The electronic device according to claim 6, wherein said output connector defines a plurality of input/output (I/O) ports; and wherein said input connector defines a single I/O port.

8. The electronic device according to claim 1, further comprising a shell surrounding said plurality of circuit boards.

9. An electronic module comprising:
a plurality of circuit boards, each having a plurality of through-holes therein, the plurality of circuit boards including a front I/O adapter circuit board, a front galvanic isolation circuit board adjacent the front I/O adapter circuit board, a switching circuit board adjacent the front galvanic isolation circuit board, and a back I/O adapter circuit board adjacent the switching circuit board;
a shell surrounding said plurality of circuit boards;
data processing circuitry carried by each of said plurality of circuit boards, wherein the front I/O circuit board carries circuitry for adapting data signals inputted from multiple ports to the front I/O circuit board for output to the front galvanic isolation circuit board, the front galvanic isolation circuit board carries circuitry providing multi-port protection and impedance matching for the data signals received from the front I/O circuit board, the switching circuit board carries multi-port communications processing circuitry for routing data signals among multiple ports, and the back I/O adapter circuit board carries galvanic isolation circuitry for an output port; and
a plurality of elongate connectors electrically and mechanically coupling said plurality of circuit boards in a stacked spaced relation defining a plurality of levels;
said plurality of elongate connectors comprising pairs of parallel first and second elongate connectors between adjacent circuit boards, and with each pair of parallel first and second elongate connectors being rotationally offset in successive levels;
each of said plurality of elongate connectors comprising first and second mating portions, and each mating portion comprising an elongate dielectric body and a plurality of contact pins extending outwardly through corresponding ones of the through-holes and secured therein.

10. The electronic module according to claim 9, wherein each of said circuit boards has a rectangular shape; and wherein said first and second elongate connectors are adjacent opposing edges of a corresponding circuit board.

11. The electronic module according to claim 9, wherein the rotation offset is ninety degrees.

12. The electronic module according to claim 9, further comprising an input connector coupled to the back I/O adapter circuit board, and an output connector coupled to the front I/O adapter circuit board.

13. The electronic module according to claim 12, wherein said output connector defines a plurality of input/output (I/O) ports; and wherein said input connector defines a single I/O port.

14. A wireless communications device comprising:
a device housing;
a wireless transceiver carried by said device housing;
an electronic module carried by said device housing and comprising
a plurality of circuit boards including a front I/O adapter circuit board, a front galvanic isolation circuit board adjacent the front I/O adapter circuit board, a switching circuit board adjacent the front galvanic isolation circuit board, and a back I/O adapter circuit board adjacent the switching circuit board,
data processing circuitry carried by at least one of said plurality of circuit boards and coupled to said wireless transceiver, and
a plurality of elongate connectors electrically and mechanically coupling said plurality of circuit boards in a stacked spaced relation defining a plurality of levels,
said plurality of elongate connectors comprising pairs of parallel first and second elongate connectors between adjacent circuit boards, and with each pair of parallel first and second elongate connectors being rotationally offset in successive levels coupled to said data processing circuitry.

15. The wireless communications device according to claim 14, wherein each of said circuit boards has a rectangular shape; and wherein said first and second elongate connectors are adjacent opposing edges of a corresponding circuit board.

16. The wireless communications device according to claim 14, wherein the rotation offset is ninety degrees.

17. The wireless communications device according to claim 14, wherein each circuit board has a plurality of through-holes therein; wherein each elongate connector comprises first and second mating portions; and wherein each mating portion comprises an elongate dielectric body and a plurality of contact pins extending outwardly through corresponding ones of the through-holes and secured therein.

18. The wireless communications device according to claim 14, wherein said data processing circuitry comprises data routing circuitry.

19. The wireless communications device according to claim 14, further comprising an input connector coupled to the back I/O adapter circuit board, and an output connector coupled to the front I/O adapter circuit board.

20. The wireless communications device according to claim 19, wherein said output connector defines a plurality of input/output (I/O) ports; and wherein said input connector defines a single I/O port.

* * * * *